No. 712,412.  
F. H. RICHARDS.  
PLAYING BALL.  
(Application filed Apr. 29, 1902.)
Patented Oct. 28, 1902.
(No Model.)
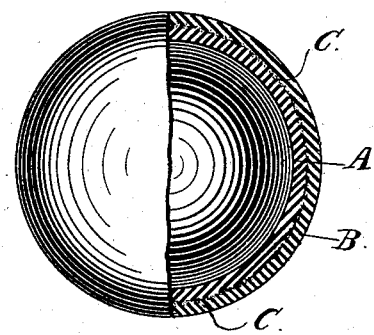
Witnesses.  
J. E. Davidson  
Fred. E. Maynard
Inventor:  
F. H. Richards

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 712,412, dated October 28, 1902.

Application filed April 29, 1902. Serial No. 105,151. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing - Balls, of which the following is a specification.

This invention relates to playing-balls; and its object is to produce an inexpensive but durable and highly resilient ball.

The accompanying drawings show, partly in section, a ball made in accordance with my present improvements.

The ball consists of an inner shell A, of hard and very resilient rubber, inclosed in a layer B of soft rubber, each of said shells or layers being preferably very thin and the two being vulcanized together, as indicated by stippling at C, so that it is impracticable to separate one shell from the other. A ball of this construction has very great flying power, due to the great activity of the hard inner shell A, which when the ball is struck instantly recovers its shape and by reaction against the bat or other implement causes the ball to fly with great speed.

One of the important functions of the soft-rubber shell B is to disseminate somewhat the force of the blow, and thus avoid liability of cracking the hard inner shell. The soft rubber by reason of its resiliency contributes somewhat to the flying power of the ball and also, by reason of its softness, renders the ball desirable for certain games. By making both the inner and outer shells thin a light ball is produced, and since the weight is very close to the periphery of the ball the latter will fly a long distance, since it is usually set in rotation when struck and by reason thereof is caused to follow a truer path and to sustain its flight for a longer time. By vulcanizing the hard inner layer and the soft outer layer together an important advantage is gained, since the layers coact to better advantage in springing from the implement, and since also the outer layer, being inseparable from the inner layer, remains a permanent protection thereto, thus prolonging the life of the ball, while the resiliency and effectiveness of each layer is modified by reason of its being integral with the other.

It will be understood that by reason of its thinness the springy qualities of the hard-rubber shell are well developed, while owing to the construction of the ball said hard rubber is also free to flex either inwardly or outwardly. To these features is due in a large measure the springy qualities which render the ball desirable for certain games.

The claims herein are intended to cover my construction, whether used as a complete ball by itself or only as a portion of a playing-ball.

Having described my invention, I claim—

1. A playing-ball comprising a thin shell of hard rubber and a covering of soft rubber vulcanized thereto; said hard-rubber shell being free to flex either inwardly or outwardly.

2. A hollow playing-ball consisting wholly of two shells, whereof the inner consists of hard rubber and the outer consists of soft rubber, said shells being vulcanized together.

3. A playing-ball comprising a thin hard-rubber shell and a layer of soft rubber vulcanized thereto; said hard-rubber shell being free to flex either inwardly or outwardly.

FRANCIS H. RICHARDS.

Witnesses:
B. C. STICKNEY,
FRED J. DOLE.